United States Patent
Loutfy et al.

(10) Patent No.: US 7,052,667 B2
(45) Date of Patent: May 30, 2006

(54) RF PLASMA METHOD FOR PRODUCTION OF SINGLE WALLED CARBON NANOTUBES

(75) Inventors: Raouf O. Loutfy, Tucson, AZ (US); Alexander P. Moravsky, Tucson, AZ (US); Timothy P. Lowe, Tucson, AZ (US)

(73) Assignee: Materials and Electrochemical Research (MER) Corporation, Tucson, AZ (US)

( * ) Notice: Subject to any disclaimer, the term of this patent is extended or adjusted under 35 U.S.C. 154(b) by 596 days.

(21) Appl. No.: 10/283,882

(22) Filed: Oct. 30, 2002

(65) Prior Publication Data

US 2003/0082094 A1 May 1, 2003

Related U.S. Application Data

(60) Provisional application No. 60/339,078, filed on Oct. 30, 2001.

(51) Int. Cl.
*D01F 9/12* (2006.01)

(52) U.S. Cl. .............................. 423/447.1; 977/DIG. 1
(58) Field of Classification Search ............. 423/447.1; 977/DIG. 1
See application file for complete search history.

(56) References Cited

OTHER PUBLICATIONS

Yashie et al., 'Novel Method for 660 Synthesis: A Thermal Plasma at Atmosphere Pressure' in *Applied Physics Letters* vol. 61 No. 23 Dec. 7, 1992 pp. 2782-2783.*

* cited by examiner

*Primary Examiner*—Stuart Hendrickson
(74) *Attorney, Agent, or Firm*—Jerome M. Teplitz

(57) ABSTRACT

Single walled carbon nanotubes are selectively produced to the substantial exclusion of multi-walled carbon nanotubes by subjecting a mixture of solid hydrocarbon, such as coal, and a transition metal catalyst, to heat generated by an RF induction system sufficient to vaporize both the solid hydrocarbon and the catalyst, and thereafter collecting the single walled carbon nanotubes thereby formed.

15 Claims, 3 Drawing Sheets

RF PLASMA METHOD FOR PRODUCTION OF SINGLE WALLED CARBON NANOTUBES

This application claims the benefit of U.S. Provisional Application No. 60/339,078, filed Oct. 30, 2001.

FIELD OF INVENTION

The present invention relates to methods and apparatus for producing carbon nanotubes, by vaporizing carbonaceous material, and metallic catalytic materials in a high temperature environment produced by a plasma, and, more particularly, to the production of single walled nanotubes "SWNTs" using a radio frequency generated plasma as the heat source to vaporize the carbonaceous and catalytic materials.

BACKGROUND OF THE INVENTION

Because of their unique structure, physical and chemical properties the recently discovered fullerene nano-tube (Single-Walled Nano-Tubes; SWNT) materials have been investigated for many applications. Indeed this is one material from which the application development has out-paced its mass availability. The most added-value applications that are being developed using nanotubes include Field Emission Devices, Memory devices (high-density memory arrays, memory logic switching arrays), Nano-MEMs, AFM imaging probes, distributed diagnostics sensors, and strain sensors. Other key applications include: thermal control materials, super strength (100 times steel) and light weight reinforcement and nanocomposites, EMI shielding materials, catalytic support, gas storage materials, high surface area electrodes, and light weight conductor cable and wires. Carbon fibers and whiskers, both of which are carbon forms other than nanotubes, have been synthesized for many decades, and have revolutionized structural materials in almost every application where lightweight and high strength are desirable qualities. Much smaller than fibers or whiskers, carbon nanotubes were discovered only recently [S. Ijima; Nature, 354, p56 (1991)].

However, to utilize this unique material in applications a high volume industrial process that can produce these nanotubes at low cost and with the required purity and physical properties (controlled length and chirality) needs to be developed. The approach is to use low cost solid starting raw materials such as carbonaceous materials "derived from Coal" both as a source of carbon and as a source of some if not all the catalyst for the growth of the SWNT. For additional catalyst materials also solid catalyst can be used. Currently, SWNT are produced on a discrete run basis by the vaporization of metal-graphite composites either in an electric arc discharge [S. Iijima and T. Ichihashi, "Single-Shell Carbon Nanotubes of 1-nm Diameter," Nature 363, 603–605 (1993) and D. S. Bethune, C. H. Kiang, M. S. deVries, G. Gorman, R. Savoy, J. Vasquez, R. Beyers; Nature, 363, 605–607 (1993); D. S. Bethune, R. B. Beyers, C. H. Kiang, "Carbon Fibers and Method for Their Production", U.S. Pat. No. 5,424,054 (1995).], or by laser pulses [P. Nikolaev, A. Thess, R. E. Smalley, "Catalytic Growth of Single-Walled Nanotubes by Laser Vaporization," Chem. Phys. Lett. 243, 49 (1995)]. In the arc discharge process, a carbon anode loaded with catalyst material (typically a combination of metals such as nickel/cobalt, nickel/cobalt/iron, or nickel and transition element such as yttrium) is consumed in arc plasma. The catalyst and the carbon are vaporized and the SWNT are grown by the condensation of carbon onto the condensed liquid catalyst. Sulfur compounds such as iron sulfide, sulfur or hydrogen sulfides are typically used as catalyst promoter to maximize the SWNT yield. When using the existing method based on arc discharge, it is difficult to increase the amount of vaporized carbon, and it is difficult to control the process parameters of the arc. In the arc the carbon rods act as the feed materials and the source (electrodes) for arc discharge. Accordingly, it is difficult to control separately these functions. This result in limited production of carbon nanotubes and in a product that is highly contaminated with other clustered carbon materials, causing the high cost of mass production. The cost of SWNT is determined by the production rate, yield, raw materials cost. The raw materials consist of carbon source, catalyst and promoters. The use of solid carbon particulate such as coal as source of carbon and some if not all of the catalyst and promoter could lead to tenfold savings in raw materials costs. The use of plasma source of intense heat can result in complete vaporization of the solid feed materials, and very high rate of production. The separation of feed materials from the source of heat gives full control of the process to maximize yield. This creates the opportunity for effective and inexpensive mass production of carbon nanotubes.

SWNT are synthesized using a gas catalytic process wherein carbonaceous material is vaporized by the application of heat under conditions appropriate to produce the SWNT. Although the mechanism is poorly understood, it is theorized that the gas synthesis process can be generally divided into three separate sub-processes. One of the sub-processes is nano-catalyst formation process, which involves the vaporization of metal catalyst and the subsequent formation of active metal nanoparticulates. Another step is sublimation/vaporization of carbon to form carbon cluster in the gas phase. This step might be eliminated if gaseous carboneous source is used. The final sub-process is the carbon nano-tube growth process, which involves the dissolution of the carbon clusters into the metal catalyst nanoparticulates, and subsequent growth of SWNT from the carbon supersaturated catalyst. This mechanism seems to be the most accepted mechanism. In the nano-catalyst formation process, parameters such as surface tension of the catalyst nanoparticulates, nanoparticulate size, shape, density and its distribution parameters are of importance to control the diameter of nanotubes and the yield. For the SWNT growth process, important parameters will include carbon vapor density and carbon saturation in catalysts, the residence time of the nanotube-growing catalyst in the gas at appropriate temperature.

Current modes of SWNT production involve the use of catalyst-packed graphite rods [D. S. Bethune et.al], or catalyst impregnated graphite rod [X. Lin, X. K. Wang, V. P. Dravid, R. P. H. Chang, J. B. Ketterson, "Large Scale Synthesis of Single-Shell Carbon Nanotubes, Appl. Phys. Lett., 64(2), 181–183 (1994).], which are consumed in a DC electric arc to produce SWNT-containing soot. A variation of the packed rod technique utilizes the catalyst as a molten metal in a small crucible onto which a graphite rod is arced, thereby co-vaporizing carbon and catalyst to form several grams of SWNT per operation [S. Seraphin and D. Zhou, "Single-Walled Carbon Nanotubes Produced at High Yield by Mixed Catalysts," Appl. Phys. Lett. 64, 2087–2089 (1994).] has also been developed. The product of the arc-based production methods contains SWNT that are coated with amorphous carbon, as well as other contaminants including amorphous and graphitic carbon particles, carbon-coated metal catalyst particles, and traces of fullerenes-$C_{60}$, –$C_{70}$, etc. Separation schemes have been devised to remove the contaminant [H. J. Dai, A. G. Rinzler, P. Nikolaev, A. Thess, D. T. Colbert, and R. E. Smalley, "Single-Wall Nanotubes Produced by Metal-Catalyzed Disproportionation of Carbon Monoxide," *Chem. Phys. Lett.* 260, 471–5 (1996)], which allow limited (1–10%) recovery of pure tubes. Relatively pure SWNT have been produced [A. Fonseca, K. Hernadi, P. Piedigrosso, J. -F. Colomer, K. Mukhopadhyay, R. Doome, S. Lazarescu, L. P. Biro, P h. Lambin, P. A. Thiry, D. Bernaerts, J. B. Nagy, Synthesis of Single- and Multi-Wall Carbon Nanotubes Over Supported Catalysts, *Appl. Phys*. A67, 11–22 (1998).; K. Hernadi, A. Fonseca, J. Nagy, D. Bernaerts, A. Lucas; Carbon, 34, 1249–1257 (1996); H. M. Cheng, F. Li, X. Sun, S. D. M. Brown, M. A. Pimenta, A. Marucci, G. Dresselhaus, and M. S. Dresselhaus, "Bulk Morphology and Diameter Distribution of Single-Walled Carbon Nanotubes Synthesized by Catalytic Decomposition of Hydrocarbons," *Chem. Phys. Lett.* 289, 602 (1998); H. M. Cheng, F. Li, G. Su, H. Y. Pan, L. L. He, X. Sun, and M. S. Dresselhaus, "Large-Scale and Low-Cost Synthesis of Single-Walled Carbon Nanotubes by the Catalytic Pyrolysis of Hydrocarbons," *Phys. Lett.* 72, 3282 (1998).] by use of gaseous carbon sources decomposed over catalyst particles either supported on inert solids or floating in gas reaction media. Several tens of grams of high-yield SWNT samples were produced whose properties varied greatly depending on the reagent gas used and the method of catalyst particle preparation. Laser vaporization of catalyst/carbon composite rods has produced over 50% yield (relative to initial carbon input) of SWNT, however, with a slower production rate compared to arc process. While some of these methods for SWNT production produce high-yield products and others are touted as "Large-Scale" processes, none produce high yield SWNT on a continuous basis with control over all production variables.

Williams and et al [K. A. Williams, M. Tachibana, J. L. Allen, L. Grigorian, S-C. Cheng, S. L Fang, G. U. Sumanasekera, A. L. Loper, J. H. Williams, and P. C. Eklund, Chemical Physics Letters, (310) 1–2, 31 (1999).] have investigated the production of SWNT from untreated bituminous coal, and they showed that SWNT can be produced, but with twofold to fourfold reduction in the purity. It was interestingly found that transition metal impurities such as pyrite in bituminous coal may actually contribute a synergistic catalytic effect and it might be possible to produce SWNT from pyrite rich bituminous coal without adding any catalyst. However, the presence of sulfur dramatically decreases the yield.

In case of coal as the particulate solid carbon source, the best coal for SWNT feedstock is one that has a high fixed carbon content and low volatile component. Two ways to use the coal have been investigated in the present invention. One, as a comparison, is to form conductive rods to be used in the arc process, and the other way is to use the coal as powder feed in the plasma reactor. Initial attempts to make rods from untreated coal failed due to excessive evolution of gas in the rods resulting in cracking of the rods during carbonization. Furthermore, for powder feed it is essential to have free-flowing powder. Accordingly, volatile component of the coal also had to be removed. Since pretreatment is required, just about any coal can therefore be used and treated to obtain its fixed carbon content. Removing the volatile component can improve the yield of SWNT production as a result of the decrease in oxygen content.

Accordingly, the present inventors have developed methods that incorporate the most successful aspects of existing SWNT production to establish the feasibility of using solid carbon such as coal including anthracite, as a source of carbon, together with a catalyst, as a way to potentially reduce the cost and produce high yield SWNT.

Moreover, the present inventors have shown that using hydrogen in the presence of iron sulfide or sulfur catalyst promoter significantly increases the yield of SWNT when using particulate solid carbon such as coal as the carbon source.

A quantitative treatment addressing physiochemical mechanisms and transport processes associated with SWNT synthesis has also been proposed by the present inventors to improve production and materials development. The composition of solid carbon or of coal, size, concentration of the metal catalyst from the coal and the concentration of the carbon clusters, together with the temperature profile as they relate to yield of SWNT production was used as an input into the physiochemical mechanistic model.

The technical feasibility of efficiently using particulate solid carbon such as coal as the carbon source to produce SWNT, in substantially continuous reactor has been demonstrated as described herein.

Although relatively large production of multi-walled carbon nanotubes is carried out in Japan (Showa Denko) where they have built and operated a 5 meter long, with 1 meter diameter reactor, the reactor is thermally controlled with an upper operating temperature of 1200° C. Under these conditions only multi-walled nanotubes MWNT can be produced, but SWNT can not be produced economically.

One objective of the present invention is to develop an improved scaled-up reactor where key process parameters can be controlled independently for the economical production of high yield of SWNT using particulate solid carbon source including such as coal based materials.

High-temperature plasma offers a convenient and advantageous source for the vaporization of carbon. It is relatively easy to produce and control, and carbonaceous and solid catalyst materials can be injected into a flowing-gas fed plasma. The flow of gas and the ability to control the volume, temperature and location of the plasma make production and collection of nanotubes with controlled properties on a continuous basis easier than in arc based reactors. Hot plasma is formed when the temperature of ions, electrons and internal particles corresponds to the thermal equilibrium conditions, at pressure of about 100 Torr and more, this temperature may be as high as 5,000 to 20,000 K. At pressure of less than 100 Torr, the temperature of ions, electrons and internal particles corresponds to non-equilibrium cold plasma and runs around 100 to 1,000 K. Hot plasma generated by using high frequency induction coils is called ICP (Inductively Coupled Plasma) and cover wider region as compared to plasma generated by DC arc discharge method, which allows preventing mixing in possible impurities from the electrode materials. Using the Hot ICP plasma method, it becomes possible to vaporize larger quantities of carbon powder and catalyst and mass-produce the carbon nanotubes. Several approaches to using plasma to vaporize coal and metal catalyst precursors for SWNT production were investigated by the inventors.

There are several approaches to create hot plasma. In one approach the plasma is created by an electric arc between electrodes located in a tube through which a flowing stream of gas is maintained. This is typically called "Plasma Spray Torches". The plasma torch can be viewed as modified arc discharge described above except the electrodes are non-consumable. The flow of gas forces the plasma plume out of the tube. Powders are introduced either into the gas stream or are injected just in front of the torch tube. The powder is rapidly heated, and the high velocity gas stream causes the molten particles to splatter onto an object to be coated or collected in a bag filter. Different gases torch design and applied power account for the temperature of the plasma and therefore determine the rate at which powder can be fed into the torch and the temperature of the emitted particles. The inventors tested this type of plasma spray systems for SWNT production using solid carbon and catalyst feed materials. Samples of ball-milled carbonized coal/catalyst powders were introduced into a Metco model 7M-plasma sprayer. Argon/helium gas mixtures were used in the experiment, and the powder was introduced into the plasma by a powder feeder that injects a stream of argon with entrained powder into the plasma directly in front of the torch.

With most metals and ceramics that are used in coatings, the metal powder is melted enough to adhere to the object that is being coated. For SWNT production, the carbon/catalyst powder must be vaporized for the reaction to occur, and the products must be cooled in an inert atmosphere. Therefore, the torch was adjusted to produce the hottest plasma, and certain experiments were run in an argon-filled container. TEM analysis of the products of these experiments showed little change in the starting material, indicating that the transfer of heat from the plasma to the powder was insufficient to vaporize the powder. This result was due to short residence times of the powder in the plasma and/or the plasma was not hot enough.

Another experiment used an experimental plasma torch that introduced the coal/catalyst powder directly into the plasma by entraining the powder in the gasses used to feed the torch. Again, it was found that short exposure time of the powder to the hot zone of the plasma was too short to cause vaporization of the fed materials and as a result no carbon nanotubes were formed.

The available plasma spray torches are designed to melt metal and ceramic powders at high feed rates and to eject the molten powders at a high speed. They are not designed to completely vaporize the powders and the high velocities cannot be reduced to increase the thermal transfer to the powder.

Independent adjustment of the parameters that control plasma temperature and residence time of the powder feed in the plasma may allow vaporization of carbon powders and therefore could produce nanotubes.

Yet another approach to create hot plasma is by high frequency induction coupling. ICP torches are used to atomize and ionize analytical samples to do electronic emission spectroscopy, mass spectral analysis, and are used in reactors to produce sub-micron sized metal powders. They can attain temperatures of well over 10,000° K, and are known to atomize materials with a high degree of efficiency and reproducibility. These qualities make ICP reactors attractive for nanotube production. Other key advantages of the ICP reactor concept are the ability to process tens of grams per minute, and the continuous nature of the feed. The ICP plasma reactor concept is being investigated for example at the Institute of Laser Plasma Physic at the Heinrich-Heine University in Dusseldorf Germany to produce nanopowders [P. Buchner, D. Lützenkirchen-Hecht, H. -H. Strehblow und J. Uhlenbusch: Production and characterization of nanosized Cu/O/SiC composite particles in a thermal rf plasma reactor, Journal of Materials Science 34 (1999), 925–931]. An inductively coupled plasma (ICP) reactor (rf generator: f=3.5 MHz, max. rf plate power 35 kw; plasma gas: argon at 400–1000 MPa) is used to produce ultrafine metal, ceramic, and composite powders (particle size ca. 10 nm) starting from metallic and ceramic precursor powders (grain size approx. 10 μnm). An attractive feature of this reactor system is the high production rate (up to 100 g/h). The inventor developed similar equipment. The ICP reactor offers high production rates with the use of powder reactants, and more importantly, with a continuous collection of product. However, it is not known whether this system can be used to vaporize solid carbon and metal particles to produce single walled nanotubes. It is known that it is possible to produce multi-walled carbon nanotubes in such system, however this product can be produced at much lower temperature than single walled nanotubes.

Y. Tanaka, Y. Matsumoto, K. Mizutani reported the production of fullerene and multi-walled carbon nanotubes [JP 2546511, Oct. 23, 1996] using carbon powder exposed to hot plasma generated using high frequency induction coil. However, they did not produce single walled nanotubes and it is not obvious that the conditions of the hot plasma can be changed sufficiently to produce such product. They also did not vaporize catalyst in their process, and it is not obvious that conditions for the hot plasma can be achieved to vaporize metal catalyst and solid carbon simultaneously to produce sufficient clusters of carbon and nanometal catalyst to grow single walled nanotubes.

A clear understanding of the general chemical mechanism of SWNT formation however, is required in order to optimize any production scheme for SWNTs with higher yield and desirable quality of SWNTs. In particular, this includes the rationalization of the role of sulfur, oxygen and hydrogen-containing impurities in the coal-derived raw starting material. The design of new processes that offer alternatives to the arc process, viable production schemes, which would enable continuous production of SWNTs in high yields, is practically impossible without preliminary quantitative assessment of the required process parameters, largely based on this mechanistic consideration. Thus, the feasibility of SWNT synthesis in Inductively Coupled Plasma (ICP) reactors and in Plasma Torch (PT) reactors was estimated based on the knowledge of the kinetic mechanism derived in the course of parametric studies by inventors of the arc production process.

The main result revealed in the detailed parametric study of the arc process of SWNT formation is that the kinetics are very reminiscent of the kinetics of fullerene formation in the arc, which was previously studied in detail [A. V. Krestinin, A. P. Moravsky, "Mechanism of Fullerene Synthesis in the Arc Reactor" Chem. Phys. Lett., v.286, 479–485 (1998)]. Therefore, a brief explanation of the main conclusions drawn from the mechanism of fullerene formation and from the quantitative description of the fullerene arc process is necessary, followed by consideration of the applicability of these results to SWNT arc synthesis and its quantitative analysis.

In fullerene arc synthesis the pure carbon vapor flowing from the narrow arc gap is idealized as a turbulent jet of cylindrical symmetry, which is described in the framework of a semi-empirical theory [G. N. Abramovich, Applied Gas Dynamics, Science, M., 1969] of heat and mass transfer in a free turbulent jet. These turbulent transfer phenomena entirely control the dynamics of carbon vapor mixing with helium gas and the resulting cooling. The diffusion of helium into the arc gap clearance is negligibly small under the narrow gap conditions. This turbulent jet model made it possible to find an analytical relationship between the essential parameters of the arc process. These include the rate of soot formation $V_{soot}$, the original carbon vapor temperature $T_o$ and velocity $U_o$, the helium pressure in the reactor P, the gap width $h_o$ and electrode diameter $2r_o$, and finally, the characteristic time for turbulent mixing and cooling of carbon vapor $\tau_{mix}$. The value of $\tau_{mix}$ turns out to be uniquely linked to the value of the fullerene yield, obtained under various arc currents, helium pressures and inter-electrode gap, and thus enable prediction of the yield from the available process parameters. An optimal value for $\tau_{mix}$ corresponds to the maximum fullerene yield, and this value must be retained constant at any variation of a parameter among those listed above, by appropriately adjusting the values of other parameters in accordance with well proven [Krestinin et. al.] relationship $\tau_{mix}=r_o^{1.5}/U_o h_o=2r_o^{2.5}P/V_{soot}RT$. So, the rate of cooling ($\tau_{mix}$) is the main and the only parameter determining the fullerene yield.

The inventors have established that the yield of SWNTs in the arc process varies with the change of helium pressure, arc current and rod feed rate in the same manner as the yield of fullerenes in the fullerene synthesis considered above. The pressure, current and feed rate dependencies of the SWNT yield all pass through a maximum, which has the same value for all three cases, thus implying existence of a unique set of parameters for optimal production of SWNTs. Therefore, it was concluded with a high degree of certainty that formation of SWNTs is a fast gas process that is kinetically governed by the same hydrodynamic factors, namely, the rate of cooling of mixed carbon/metal vapor. The same analytical approach, described above, seems applicable to mixed carbon/metal vapor condensation under arc conditions, since the metal component content in the vapor is low enough to consider its influence on gas dynamics parameters as a small perturbation.

The existence of a unique optimal set of externally controlled parameters for SWNT production in the arc, and of an analytical relationship between those parameters, means that there exists a set of internal parameters that are optimal for the process. The internal parameters include at least the process temperature, carbon and metal vapor density, the rate of vapor cooling, and can only be controlled indirectly. These factors govern the production rate of SWNTs by influencing he mechanism of mixed vapor condensation. The process can be effected at any of its kinetic stages, such as during the build up or steady state performance of metal catalyst particles during their positioning and deactivation, or during separate conversions of carbon vapor that results in soot formation, etc. Other experimental schemes that are potentially capable of intense generation of mixed carbon/metal vapor in hot plasma environment, such as ICP and PT techniques, will produce SWNTs if the values of these process governing factors are maintained the same as in the optimal arc process. In other words, it is a plausible assumption that in any hot plasma carbon/metal system, it is necessary to maintain certain temperature profile and vapor density, pertinent to optimal arc process, to eventually obtain SWNTs. This was the approach pursued by the inventors; to as closely as possible mimic the temperature and vapor density conditions found in the arc, while designing ICP and PT experimental setups intended for obtaining SWNTs on a much larger scale than the arc process.

A simple way to assess experimental conditions and geometry required for viable ICP and PT processes consists of reproducing the useful power density of the arc in the hot plasma region of ICP and PT reactors, and proportional scaling up of the amount of carbon and metal powders fed into the plasma. Assuming that all carbon and metal particulates are vaporized in the hot plasma plume or ball, the reaction zone will have the appropriate temperature and vapor density. The cooling rate can be adjusted by regulating the inert carrier gas (argon) flow rate. For example, the typical value for the useful power density of the SWNT producing arc can be estimated as ca. 2 kw/cm$^3$. This value ensures complete vaporization of ca. 0.3 g of carbon and catalyst metal particles per minute. The condensation process of this initially ca 3700 K hot vapor, taking place during ca. 1 ms during fast mixing of the vapor with buffer gas yields ca. 15 mass. % of SWNTs in the condensed soot. To scale up the SWNT production rate of an ICP reactor by a factor of 10, the hot plasma ball of the ICP reactor should be ca. 10 cm$^3$ (10 times that of the arc hot zone) in volume. The induction coil used to generate the plasma should be capable of developing ca. 20 kw power in the argon gas at 200–700 Torr in the ICP reactor, and the carbon/metal powder feed rate should be ca. 3 grams/minute (the ICP experiments were carried out at various feed rates and 1.5 gram/minute appeared optimum). The standard LEPEL T-40 radio frequency generator can meet this power requirement, while using a 20 mm in inner diameter quartz tube for a reactor to create a plasma ball constrained within 10 cm$^3$, which were the actual tube size and power levels employed by the inventor and demonstrated that the predicted yields could be obtained.

The ICP reactor and overall carbon vaporization rate can be further scaled up, in contrast to the arc process. For example, an ICP reactor employing 200 kw power in the induction coil and a flow-through tube 44 mm in inner diameter was capable of vaporizing under hot plasma conditions up to 100 g/min of pure graphite powder in a fullerene producing process, yielding ca. 6% of fullerenes in the product [Tanaka et. al.]. Up to 1 MW RF power supplies are commercially available, so potential capabilities of the ICP method for high rate SWNT production far surpass those of the arc which is presently the main process for bulk SWNT manufacturing. When combined with the possibility to use such low cost raw material as coals, the ease of scaling the ICP method makes it ideal for the development of an industrial scale SWNT production process.

Therefore, considering the foregoing, a need remains for improved methods of producing single-wall carbon nanotubes, with very high purity and homogeneity in processes with improved conversion efficiency of feedstock to single walled nanotubes (SWNT). The combination of RF hot plasma system, and the use of solid feed materials at the specific operating conditions could be a practical method to mass produce the SWNT product.

SUMMARY OF THE INVENTION

This invention relates to the method of effective mass production of single-wall carbon nanotubes of high purity, homogeneity at high yield from solid carbon materials such as coal. In the reaction of this method, single-wall carbon nanotubes are produced in a reaction zone at high temperature created by hot plasma such as RF plasma.

An ICP reactor system was designed for SWNT production from solid carbon such as coal. This system offers the advantages of powder feedstock, continuous production and high throughput. The successful design utilizes a closed system as shown in FIG. 1. The high frequency power supply was a Lepel model T-40 (11) that powered a multi-turn water-cooled induction coil (12) wrapped around a water-cooled (13) reaction tube (14). A vibratory powder feeder (15) was used to shake coal/catalyst powder into the stream of argon that was maintained at a pressure of 300 torr. The powder entered the plasma (16), was vaporized and condensed into nanotubes and other products, which were collected in the trap (17). The pressure of the reactor is maintained using vacuum pump (18). The powder feeder is installed above the reactor (14) and its operation was flawless even though ultrafine powder was used. An alternative feeding mechanism is to fluidize the powder from the bottom into the hot plasma zone as shown in the schematic in FIG. 2. In this case the pressure control (28) and product collection (27) will be from the top. This approach allows for the control of the residence time of powder feed in the hot zone.

In case of coal as source of solid carbon two Premium Coal samples selected by the present inventors for comparison were a low volatile bituminous coal (Pocahontas, Va.) and a high volatile bituminous coal (Pittsburgh, Pa.). The two coal samples were carbonized at 1000° C. for 4 hours under argon atmosphere. Commonly, the temperature was increased slowly at 5° C./minute under a slow flow of argon while pulling a light vacuum. Outgassing occurred from about 200–700° C. After most of the gasses had left the sample, a vacuum of several millitorr was applied while continuing heating at 7° C. under a slow flow of argon. Conditions of 1000° C. and millitorr vacuum were maintained for one hour. Carbonization of the high-volatile bituminous coal (Pittsburgh) produced shiny gray-black cakes with lots of voids, with a weight loss of 31.6%, which correspond closely to reported data of 37% volatile material. It appears that during heating, the high-volatile coal becomes molten, and gasses that are evolved create a brittle, sponge-like cake. Carbonization of the low volatile coal (Pocahontas) produced a more compact brick of granular, black carbon that was more friable than the high-volatile material. Weight loss was 18.2%, which compares well to reported data of 18%. The carbonized coals were ground in a mill-style laboratory grinder and sieved to 50–125 micron particle size. The carbonized coal powder was ball-milled with micron sized metal catalyst powder to produce starting materials for feed powder for plasma-based reactors or for making rods for arc discharge reactor for comparison. Choice of catalyst was made based on previous SWNT production experience of the inventors. Cobalt: nickel catalyst with a 3:1 atomic ratio was used with 2.5 atomic % metal content in the finished product (powder for plasma-based reactors, and rods for arc discharge reactor).

The arc discharge rods were made by mixing the treated coal/catalyst powder with pitch binder, then pressing 1×1× 7.5 cm rods. The rods were then carbonized at 1000° C. in argon for two hours. The resultant rods had a density of approximately 1.7 g/cc, which is considered being very competitive to commercial carbon rods. The 3:1 Co:Ni metal catalyst content was 11.5 wt %, which corresponds to 2.5 atomic % metal. Similar rods were prepared from graphite/catalyst powder mixtures for comparison.

For plasma based reactor the mixture of the graphitized coal and/or graphite with the metal catalyst was used as is. This eliminates the rod fabrication step, which is expensive.

The cold plasma can easily be initiated by ionizing gas by high frequency field without powder feed. The power can then be adjusted to obtain hot plasma. When the powder is feed intense plasma is generated because of the vaporization and the ionization of the metal catalyst. The plasma then stabilizes and spreads down the tube, FIG. 1 (14). The powder feed can almost be seen by observing the higher intensity of the plasma where the powder vaporizes. This system was operated under different power conditions, pressure and with different size feed. Ultrafine solid carbon or coal (1–5 μm size) was required to vaporize all of the carbon based material in the short residence time employed in operating this reactor. The product can be collected and sampled from the filter bag or trap, FIG. 1 (17).

TEM micrographs of the collected product from ICP reactor are shown in FIG. 3. As can be seen, SWNTs were produced, and to our knowledge this is the first time that SWNTs from solid carbon or coal were produced in a plasma chemical system. Typically fine powder or multi-walled nanotubes (MWNT's) are produced in similar reactors. The intensity of the plasma, the residence time of the powder in the hot zone of the reactor chamber, the size of the powder feed, and the gas composition are all important parameters to control the type of product produced. The main effect of all these parameters is to ensure the vaporization of the carbon. Of course, if carbon in the hot zone is vaporized, the metal catalyst in the hot zone will also vaporize. The quenching rate and concentration of the vaporized product will dictate the type of nanotubes produced. In accordance with our invention, the ability to control the gas flow rate in our designed ICP system allowed us to control the concentration of metal catalyst resulted in very small and nano-size catalyst metal particles only to be formed, promoting the selective formation of only SWNTs.

Characteristics of the SWNTs were estimated from a large number of TEM images. The bundle diameters of the SWNTs produced from coal using the ICP technique were found to be about 8 nm. This bundle diameter is smaller than those obtained in the arc process (~10 nm) and smaller than the bundle diameter obtained by Williams et al (~13 nm) of SWNTs produced from coal in the arc process. Smaller bundles are easier to disperse. From the side-wall fringes, in the TEM micrographs, the diameter of the individual SWNT was estimated to be ~1.25 nm. This diameter is larger than the SWNT produced by Williams et al (~1.0 nm), but is smaller than the SWNT diameter produced in the arc process (~1.35 nm). The catalyst metal nanoparticles, which appear as dark regions in the TEM, FIG. 2, were about the same size as the metal particles produced in the arc using graphite as the carbon precursor (average 24 nm).

None of the TEM images evaluated contained any evidence of multiwalled tubes, indicating that the nanotube product synthesized in accordance with our invention is only SWNT.

For production rate and scale up, it can be envisioned that this process is easy to scale up, being nearly continuous, and can be automated.

TEM is currently the most reliable method of analysis, since high resolution is required to discern individual nanotubes types, and to identify the bundle size and the SWNT dimension. Several analytical techniques are now available for determining the yield the SWNT. However it should be emphasized that the problem of evaluating the purity of SWNT sample is a difficult problem, and currently there is no protocol for comparison of SWNT yields in samples prepared by different techniques. This is especially true because of the inhomogenity in the samples. Two particular techniques are to some degree have been accepted by different groups working in this field. These two techniques are Raman spectroscopy and Thermogravimetric techniques. The thermogravimetric analysis (TGA) is used to decompose the sample in air, thereby selectively oxidizing the various particulate components of the soot sample. The nanotubes are more resistant to oxidation, and a weight percent measurement can be made. In addition, the amount of metal catalyst particles can also be readily analyzed from the weight of residue after the carbon materials are combusted. Raman spectroscopy gives a quantitative assessment of the types of SWNT in the sample. These analytical tools are complementary to the TEM analysis, and provide a less expensive and more rapid quantitative characterization of SWNT products. Both from TGA analysis and Aerial density measurement indicated that the yield of SWNT produced in the present system is comparable to the arc discharge method. However, the production rate is 12 times the rate of the arc process in only 20 mm diameter reactor. This result is very encouraging for further improvement and scale up.

We determined that initial problems with getting sufficiently hot plasma could be overcome by increasing the pressure of the argon atmosphere. In a preferred example, run conditions that were found to produce SWNTs were 400 torr Ar at a flow rate of 2.0 l/minute. Carbonized coal with 2–100 micron particle size was ball milled with 2.6 atomic % mixture of cobalt/nickel catalyst metals with Co:Ni ratio of 3:1 (atomic). This powder mixture was fed into the reactor (20-mm diameter) at a rate of 1.5 grams/minute. More optimization may improve nanotube yield, because the operating variables in this system are quite few and it is designed so that their optimization can potentially result in a practical and commercial method to produce large volume and low cost SWNTs. In addition, this technique takes real advantage of the low cost of powder carboneous materials like coal as the source of raw materials by using its natural powder form with simple pretreatment.

DESCRIPTION OF PREFERRED EMBODIMENTS

Figure 1:
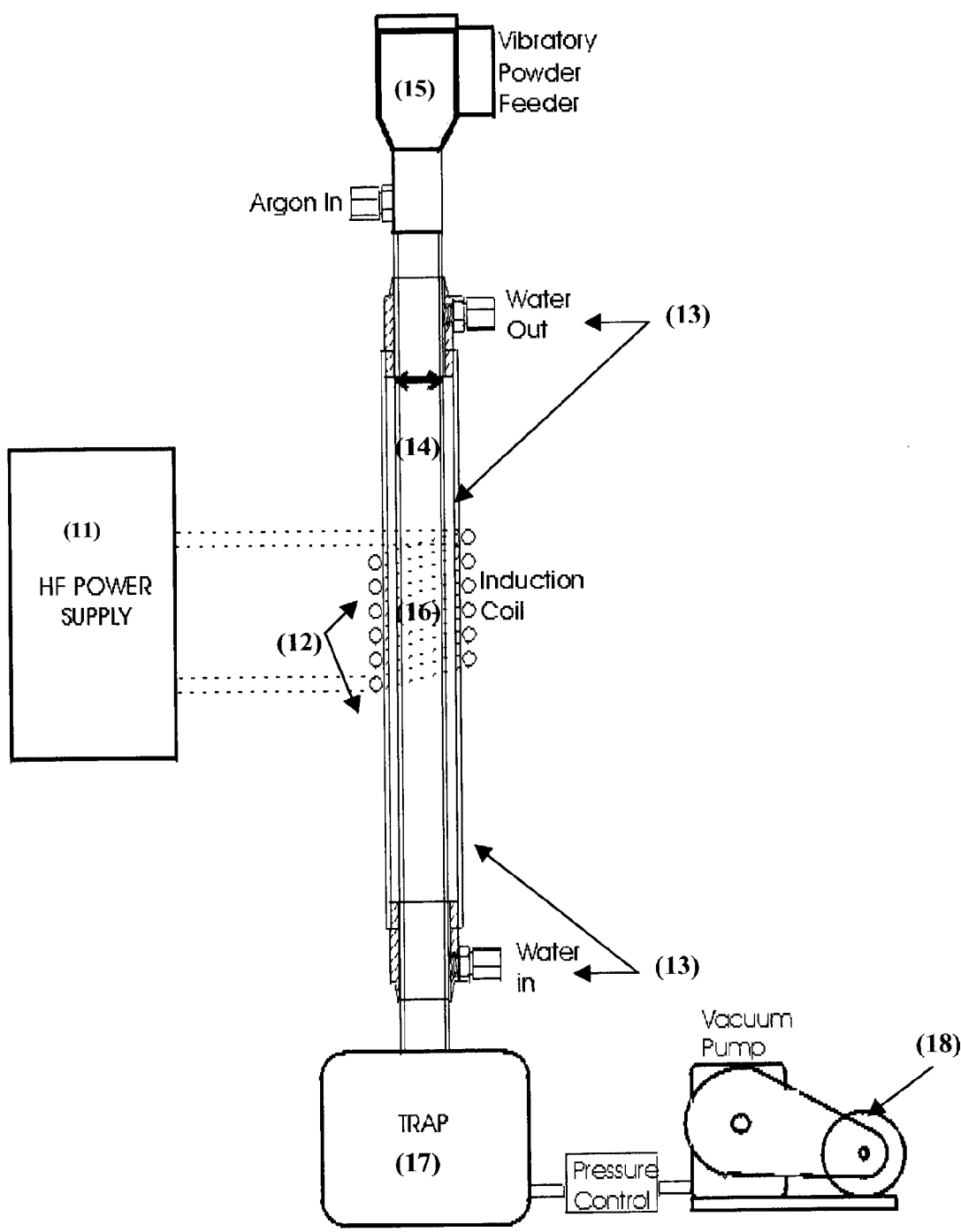
FIG. 1 shows a general schematic of RF plasma flow reactor for the production of single wall carbon nanotubes with solid gravity feed of reactant, and hot plasma zone (16) in which the solid feed is vaporized for the growth of single-wall carbon nanotubes.

In accordance with the present invention there is provided a novel method of producing fullerenes comprising Single Walled nanotubes (SWNT's), which comprises providing a source of carbon and a catalyst comprised essentially of a transition metal of the iron group of the periodic table of elements and sulfur in a reaction zone having a SWNT forming atmosphere comprised essentially of a plasma forming gas and subjecting the carbon and catalyst to plasma heat in the reaction zone. The heat causes the carbon and catalyst to vaporize producing a carbon and metal containing vapor that is quenched therein to condense the vapor resulting in the formation of the SWNT product outside of the heated reaction zone, where it is recovered.

In a preferred embodiment the SWNT atmosphere contains an inert gas advantageously argon or helium and optionally some hydrogen gas. The SWNT forming atmosphere is preferably maintained at a pressure in the range of 10 Torr to 760 Torr (0.013 to atmosphere).

In a preferred embodiment the metal catalyst is comprised essentially of one of iron, cobalt, or nickel powder or any mixture of these powders.

In a preferred embodiment the reaction zone is heated in an Inductively Coupled Plasma (ICP) system in a reaction chamber, wherein the SWNT atmosphere is maintained. Carbon is introduced to the plasma ball as a flow of the powder to provide more surface area and faster vaporization.

The catalyst mixture is also fed into the plasma ball preferably as a powder. The desired catalyst component ratio may be provided by supplying pure components in the desired ratio or by alloying and combining them in the desired ratio or by combining them in several convenient mixtures or alloys that when fed to the plasma ball combine to form the desired composition of SWNT forming atmosphere.

In a preferred embodiment an ICP reactor capable of developing 0.2–5 kw/cm$^3$ power density in plasma volume is used to vaporize carbon/metal feed powder and produce SWNTs. Preferably the power density is in the range 1–3 kw/cm$^3$ to ensure complete vaporization of carbon and metal powder particles in the plasma ball.

In a preferred embodiment, the linear size of carbon powder particles is in the range 1 μm -150 μm. More preferably, carbon particles are of 1–5 μm size that ensures more complete vaporization at a given plasma power density and residence time and/or allows using lower power density and shorter residence time. For the same reason it is expedient to use fine and ultrafine metal powders of the particle size 0.05–10 μm and preferably 0.5–2 μm.

In a preferred embodiment the feed rate of mixed carbon/metal powder specified for 1 kw power developed in plasma is in the range 0.01÷0.1 g/min. kw, at which rate complete vaporization of carbon is achieved depending on powder particle size and residence time of particles in the plasma zone.

In a preferred embodiment, the plasma forming gas flux is in the range of 0.01–10 l/min. cm$^2$, preferably 0.1–0.5 l/min. cm$^2$ to ensure appropriate residence time of powder in the reaction zone and temperature profile along the reaction coordinate.

In a preferred embodiment, the pressure of the plasma forming gas lies in the range 50-760 Torr and preferably in the range 200–400 Torr to maintain the hot plasma regime of reactor operation, which ensures the vaporization of raw materials and efficient formation of SWNTs.

The following examples describe the preferred embodiments of the present invention, with description of the apparatuses, processes, procedures and results of particular and representative runs and products and comparative examples been given. The detailed description falls within the scope of, and serves to exemplify the more generally described process set forth above. The examples are presented for illustrative purposes only, and are not intended as a restriction on the scope of the invention.

EXAMPLE 1

SWNT are typically made from graphite rods that are drilled coaxially and tightly packed with a mixture of catalyst and graphite powder. Graphite rod with 5/16" (8 mm) diameter was center drilled and packed with catalyst. The catalyst was 3:1 Co:Ni metal catalyst content was 11.5 wt %, which corresponds to 2.5 atomic % metal. The rods were vaporized by arcing the rods in an inert gas atmosphere using an arc reactor made of quartz chamber. From our extensive previous experience with graphite rod starting materials, the approximate conditions to produce SWNT from the catalyst-packed graphite were known. A gap is maintained by adjustment of the stepper motor speed. Pressure of helium, rod feed rate and current are maintained constant by instrument control. The voltage is allowed to vary, but remains relatively stable while equilibrium conditions of rod consumption are maintained. A single rod is consumed in about 60 minutes producing about 5 grams of products, and the products were recovered for each run. This equipment is currently the most successful for making SWNT from graphite starting materials, and is the apparatus of choice for testing SWNT production. A key feature of this Quartz Arc reactor for SWNT production is the rotating cathode. This feature was found to be critical in maximizing the yield of SWNT and smoothing the operation of the arc. SWNT gets destroyed or deteriorated if they remaining near the arc. Rotating the cathode avoids this situation. Furthermore, slag build up on the cathode with time, which results in uneven and variable gap distance with time. Again the cathode rotation maintains the slag to a minimum and as result a smooth operating condition is maintained.

The usual yield of nanotubes in the soot from these rods is on the order of 10–20 wt % nanotubes with the remainder of the product being carbon-coated catalyst metal particles that are 5–50 nm in diameter, and amorphous carbon. The key operational parameters for the graphite-catalyst powder packed graphite rods are given in Table 1.

TABLE 1

Operating Arc Discharge Parameter For Packed Graphite-Catalyst Powder Graphite Rods

|  | Packed Graphite Rods |
|---|---|
| Dimensions (mm) | 8 × 200 (cylindrical) |
| Cross-section (mm$^2$) | 49.5 |
| Density (g/cc) | 1.9 |
| Current (amperes) | 96 |
| He pressure (torr) | 450 |
| Feed rate (mm/minute) | 1.5 |
| Approx. voltage | 22–23 |

The products from the arc runs were collected and analyzed by Transmission electron microscopy (TEM). Arial measurements from TEM micrographs of the products indicate yields of about 15–18 wt % SWNT were obtained. In terms of production rate of the arc process, as pointed out, a rod can be burned in about 60 minutes, producing about 5 gm of products. The production rate in the small laboratory reactor is therefore 0.083 grams/minutes. Since there is a limitation (yield decreases with larger diameter rods) in the diameter of the rod used then scale up can be by increasing rod length, and duplicating reactors. Nevertheless these rates, while they are adequate for existing demand, are very low for practical applications.

EXAMPLE 2

Coal composite rods were made by mixing the treated coal/catalyst powder with pitch binder, then pressing 1×1× 7.5 cm rods. The rods were then carbonized at 1000° C. in argon for two hours. The resultant rods had a density of approximately 1.7 g/cc, which is considered being very similar to commercial carbon rods. Cobalt: nickel catalyst with a 3:1 atomic ratio was used with 2.5 atomic % metal content in the finished rods. Coal composite rods were arced in the Quartz reactor described in example 1. The composite coal rod was installed in the lower electrode (anode), and is moved via a stepper motor to contact the broad upper electrode (cathode). A gap is maintained by adjustment of the stepper motor speed. Pressure of helium, rod feed rate and current are maintained constant by instrument control. The voltage is allowed to vary, but remains relatively stable while equilibrium conditions of rod consumption are maintained. A single rod is consumed in about 40 minutes producing about 5 grams of products.

TABLE II

Operating Arc Discharge Parameter For Packed for Packed Coal-Catalyst Composite Rods.

|  | Composite rods |
|---|---|
| Dimensions (mm | 10 × 10 × 76 (square) |
| Cross-section (mm ) | 100 |
| Density (g/cc) | 1.7 |
| Current (amperes) | 145 |
| He pressure (torr) | 450 |
| Feed rate (mm/minute) | 2.0 |
| Approx. voltage | 22–23 |

The key operational difference between the graphite-catalyst powder packed graphite rods and the composite coal-catalyst rods was the rate of burn or the feed rate required maintaining the gap voltage constant. Much higher burn rate was observed for the coal-catalyst composite rods. This of course is beneficial as it increases the production throughput, provided the product is of the same quality. The products from the arc runs were collected and analyzed by Transmission electron microscopy (TEM). The coal composite rods produced an abundant amount of SWNT. Arial measurements from TEM micrographs of the two products indicate yields of about 17 wt % SWNT were obtained which is very similar to the result of example 1.

A large number of TEM images were taken and the characteristics of the SWNT were estimated. The bundle diameter of the SWNTs produced from coal and from graphite was found to be about 10 nm. The side-wall fringes are well defined in the SWNT samples produced from coal compared to those produced from graphite. There also appears to be more amorphous carbon on the SWNTs produced from graphite, which could result in the poor side-wall fringes. From the side-wall fringes the diameter of the individual SWNT was estimated to be ~1.5 nm. This diameter is larger than the SWNTs produced by Williams et al, and again can be explained by the differences in the catalyst used in both systems. Larger diameter SWNTs could be more desirable for gas storage for example. One striking difference between the product produced from coal to that produced from graphite is the size of the metal catalyst. The metal nanoparticles, which appear as dark regions in the TEM, were almost half the size (average 12 nm) when using coal as compared to metal nanoparticles produced from graphite (average 20 nm). This is a statistically significant difference and can possibly be a result of the presence of the sulfur in coal. Small catalyst is very useful in producing smaller bundles. Small bundles are easier to disperse.

In terms of production rate of the arc process, as pointed out, a rod can be burned in about 40 minutes, using the coal composite rods, producing about 5 gm of products. The production rate is therefore 0.125 grams/minutes. While this production rate is about 50% greater than the production rate of packed graphite rods, nevertheless these rates are very low for practical applications.

EXAMPLE 3

Figure 2:
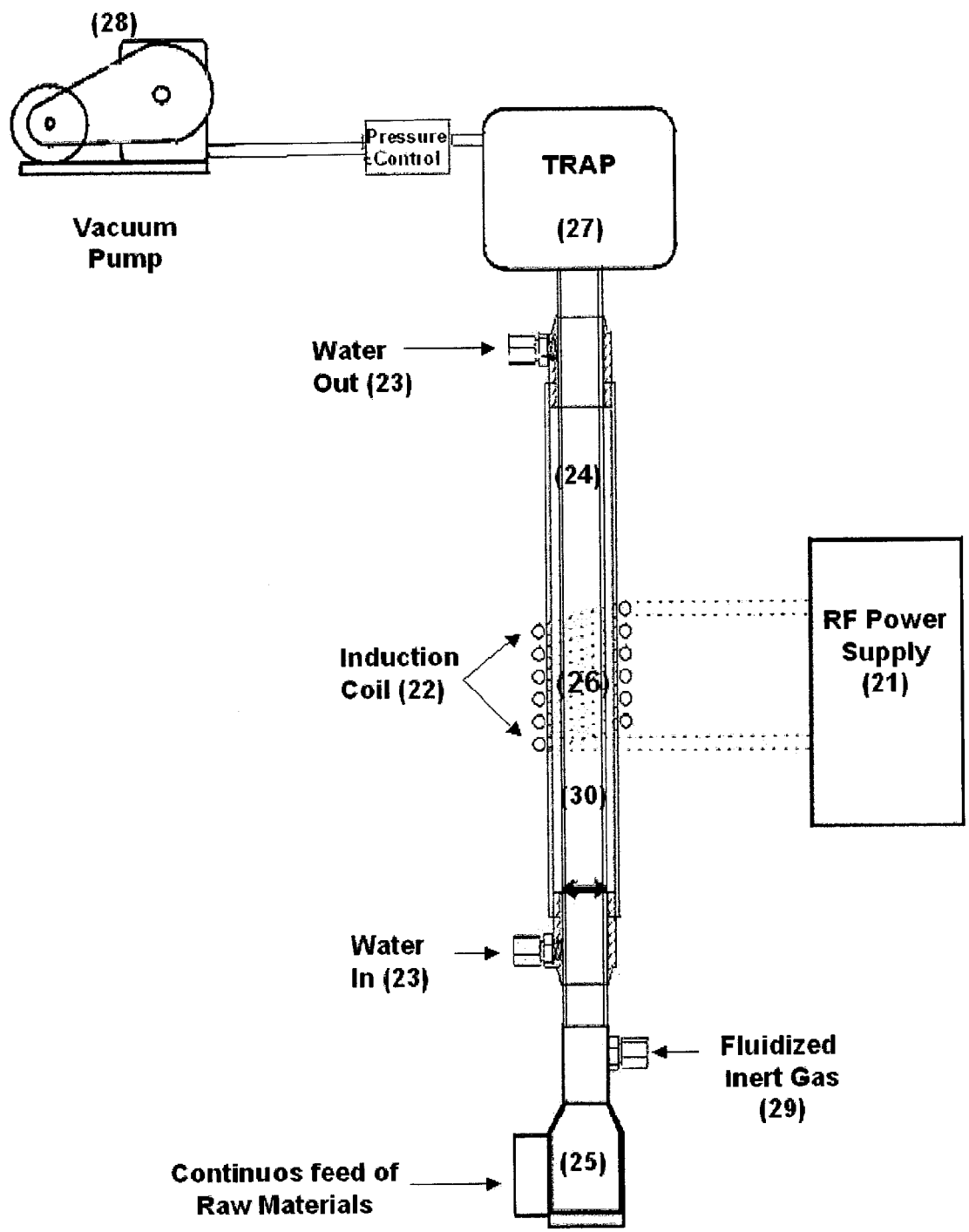
FIG. 2 shows a general schematic of RF plasma flow reactor for the production of single wall carbon nanotubes with solid reactant feed from the bottom by fluidization. The high frequency power supply was a Lepel model T-40 (21) that powered a multi-turn water-cooled induction coil (22) wrapped around a water-cooled (23) reaction tube (24). A continues powder feeder (25) is used to feed the carbon/catalyst powder, that can be fluidized with a stream of inert fluidizing gas (29) such as argon. The fluidized powder (30) enters the plasma (26), was vaporized and condensed into nanotubes and other products, which were collected in the trap (27). The pressure of the reactor is maintained using vacuum pump (28). The fluidization of the powder feeder into the plasma allows for the control of the residence time powder feed in the hot zone.
Figure 3:
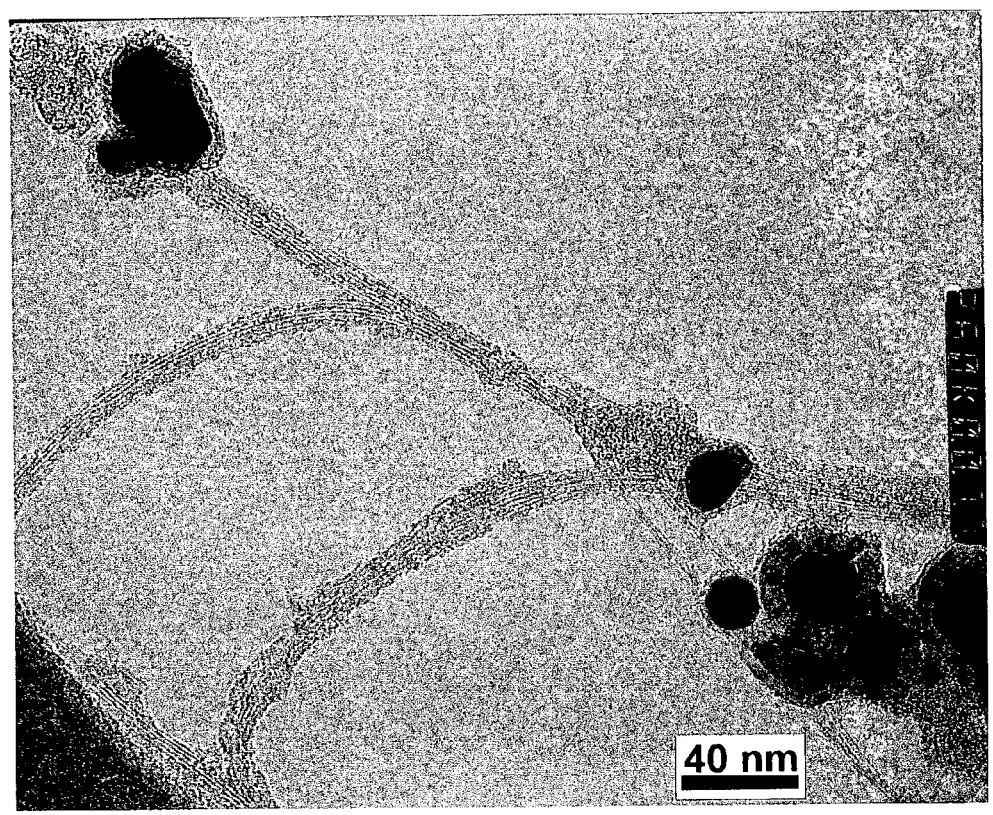
FIG. 3 shows TEM micrograph of the product according to the present invention.

Carbonized coal with 2–100 micron particle size was ball milled with 2.6 atomic mixture of cobalt/nickel catalyst metals with Co:Ni ratio of 3:1 (atomic). This powder mixture was fed into the reactor system described in FIG. 1., at a variable rate from 1.5 grams/minute to 3 grams/minute. In a preferred example, run conditions that were found to produce SWNTs were 400 torr pressure, at an inert gas flow rate flow rate of 2.0 l/minute of argon. The induction coil used generated plasma at about 20 kw power. The standard LEPEL T-40 radio frequency generator was used. The reactor was a 20 mm inner diameter quartz tube, the created plasma ball was constrained within 10 cm$^3$, which were the actual tube size and power levels employed in the experiments that demonstrated that the predicted yields could be obtained. The optimum feed rate where all feed was vaporized within the allowed residence time and plasma power conditions was found to be 1.5 gram/minute. A large number of TEM images were taken and the characteristics of the SWNTs were estimated. The bundle diameters of the SWNTs produced from coal using the ICP technique were found to be about 8 nm. This bundle diameter is smaller than those obtained in the arc process (~10 nm). Smaller bundles are easier to disperse. From the sidewall fringes the diameter of the individual SWNT was estimated to be ~1.25 nm. This diameter is smaller than the SWNT diameter produced in the arc process (~1.5 nm). The catalyst metal nanoparticles, which appear as dark regions in the TEM FIG. 2., were about the same size as the metal particles produced in the arc using graphite as the carbon precursor (average 24 nm). Arial measurements from TEM micrographs of the products indicate yields of about ca. 15 mass. % of SWNTs in the condensed soot were obtained which is very similar to the result of example 1 and example 2.. However, the production rate was up to 1.5 grams/minute, which is 12 times the rate of the arc process in only 20-mm diameter reactor with the potential of easy scaling up to a continues system.

None of the TEM images evaluated contained any evidence of multiwalled tubes, indicating that the nanotube product synthesized in accordance with our invention is pure SWNT.

While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method of selectively producing single wailed carbon nanotubes to the substantial exclusion of multi-wailed carbon nanotubes, comprising introducing a mixture of carbonaceous material comprising a solid hydrocarbon and a catalyst comprising at least one transition metal into a reaction zone that is maintained under reduced atmospheric pressure and in a non-oxidizing condition suitable to form single walled carbon nanotubes when subjected to heat, subjecting said reaction zone containing said carbonaceous material and said catalyst to heat generated by an RF induction system external of said reaction zone so as to produce plasma in said reaction zone thereby vaporizing said carbonaceous material and said catalyst and forming single wailed carbon nanotubes, causing said single wailed carbon nanotubes to leave said reaction zone, and collecting said single wailed carbon nanotubes, wherein said solid hydrocarbon is coal.

2. The method of claim 1, wherein said carbonaceous material and said catalyst are introduced into said reaction zone in the form of a fluidized stream of particles.

3. The method of claim 2, wherein said fluidized stream of particles is flowed into said reaction zone at a flow rate within the range of from about 1 to about 500 grams per minute.

4. The method of claim 2, wherein said particles in said fluidized stream have a particle size within the range of from about 1 to about 150 microns.

5. The method of claim 1, wherein said non-oxidizing condition is maintained by flowing an inert gas through said reaction zone at a flow rate within the range of from about 0.1 to about 10 liters per minute per cm$^2$ of reaction zone.

6. The method of claim 1, wherein said reduced atmospheric pressure is within the range of from about 50 to about 750 torr.

7. The method of claim 1, wherein the temperature within said heated reaction zone is maintained within the range of from about 2,000 to about 10,000° C.

8. The method of claim 1, wherein said RF induction system develops a plasma power density within the range of from about 0.2 to about 5 kw/cm$^3$.

9. A method of selectively producing single walled carbon nanotubes to the substantial exclusion of multi-walled carbon nanotubes, comprising introducing a mixture of carbonaceous material comprising a solid hydrocarbon and a catalyst comprising at least one transition metal into a reaction zone that is maintained under reduced atmospheric pressure and in a non-oxidizing condition suitable to form single walled carbon nanotubes when subjected to heat, subjecting said reaction zone containing said carbonaceous material and said catalyst to heat generated by an RF induction system external of said reaction zone so as to produce plasma in said reaction zone thereby vaporizing said carbonaceous material and said catalyst and forming single walled carbon nanotubes, causing said single walled carbon nanotubes to leave said reaction zone, and collecting said single walled carbon nanotubes, wherein said carbonaceous material and said catalyst are introduced into said reaction zone in the form of a fluidized stream of particles which is flowed upwardly into said reaction zone thereby controlling the residence time of said particles in said reaction zone.

10. The method of claim 9, wherein said solid hydrocarbon is coal.

11. The method of claim 10, wherein said transition metal is selected from the group consisting of nickel, cobalt, iron and mixtures or alloys thereof.

12. The method of claim 9, wherein said transition metal is selected from the group consisting of nickel, cobalt, iron and mixtures or alloys thereof.

13. A method of selectively producing single walled carbon nanotubes to the substantial exclusion of multi-walled carbon nanotubes, comprising introducing a mixture of carbonaceous material comprising a solid hydrocarbon and a catalyst comprising at least one transition metal into a reaction zone that is maintained under reduced atmospheric pressure and in a non-oxidizing condition suitable to form single walled carbon nanotubes when subjected to heat, subjecting said reaction zone containing said carbonaceous material and said catalyst to heat generated by an RF induction system external of said reaction zone so as to produce plasma in said reaction zone thereby vaporizing said carbonaceous material and said catalyst and forming single walled carbon nanotubes, causing said single walled carbon nanotubes to leave said reaction zone, and collecting said single walled carbon nanotubes, wherein said transition metal is selected from the group consisting of nickel, cobalt, iron and mixtures or alloys thereof.

14. The method of claim 13, wherein said catalyst is present in said mixture in an amount within the range of from about 0.5 to about 30 weight percent.

15. The method of claim 13, wherein said solid hydrocarbon is coal.

* * * * *